(12) United States Patent
Poerio

(10) Patent No.: US 9,772,127 B2
(45) Date of Patent: Sep. 26, 2017

(54) SOLAR TURBO PUMP—HYBRID HEATING-AIR CONDITIONING AND METHOD OF OPERATION

(71) Applicant: Wayne Poerio, Tequesta, FL (US)

(72) Inventor: Wayne Poerio, Tequesta, FL (US)

(73) Assignee: JOI Scientific, Inc., Kennedy Space Center, Merritt Island, FL (US)

( * ) Notice: Subject to any disclaimer, the term of this patent is extended or adjusted under 35 U.S.C. 154(b) by 0 days.

(21) Appl. No.: 14/830,518

(22) Filed: Aug. 19, 2015

(65) Prior Publication Data

US 2015/0354868 A1    Dec. 10, 2015

Related U.S. Application Data

(63) Continuation-in-part of application No. 13/415,108, filed on Mar. 8, 2012, now abandoned.

(60) Provisional application No. 61/450,439, filed on Mar. 8, 2011.

(51) Int. Cl.
  *F25B 27/00* (2006.01)
  *F25B 30/02* (2006.01)
  *F03G 6/06* (2006.01)
  *F01K 15/00* (2006.01)

(52) U.S. Cl.
  CPC ............ *F25B 27/005* (2013.01); *F01K 15/00* (2013.01); *F03G 6/065* (2013.01); *F25B 30/02* (2013.01); *Y02B 10/22* (2013.01); *Y02B 10/24* (2013.01); *Y02E 10/46* (2013.01)

(58) Field of Classification Search
  CPC ........ F25B 30/02; F25B 27/005; F03G 6/065; F01K 15/00; Y02B 10/22; Y02B 10/24
  See application file for complete search history.

(56) References Cited

U.S. PATENT DOCUMENTS

| 1,944,908 | A | 1/1934 | Shurtleff |
| 2,021,052 | A | 11/1935 | Dickey |
| 2,952,138 | A | 9/1960 | Russell et al. |
| 3,491,545 | A | 1/1970 | Leonard, Jr. |
| 3,552,142 | A | 1/1971 | Schlichig |
| 3,605,436 | A | 9/1971 | Gammill, Jr. |

(Continued)

FOREIGN PATENT DOCUMENTS

| AT | 507218 | 3/2010 |
| DE | 102005053589 | 5/2007 |

(Continued)

*Primary Examiner* — Emmanuel Duke
(74) *Attorney, Agent, or Firm* — Krishna Kalidindi

(57) ABSTRACT

A closed loop system utilizing a solar refrigerant turbocharger and pump in conjunction with a solar collector to operate a heating and cooling system for a building by utilization of a renewable energy source. The liquid pump within the solar turbocharger is used to boost the refrigerant pressures into the solar collector, the refrigerant absorbs heat inside the solar collector and changes phase from a liquid to a vapor. The vapor is expanded across the turbine causing the turbine to spin. The ability of the refrigerant to change phase or flash from a liquid to a vapor is due to the solar energy that is transferred from evacuated tubes into the solar collector manifold and into the refrigerant. The gas is routed to the solar turbo pump turbine to drive the compressor and liquid pump. The resulting fluid gas leaving the turbine is routed to the condenser for normal operation.

15 Claims, 21 Drawing Sheets

(56) References Cited

U.S. PATENT DOCUMENTS

| | | | |
|---|---|---|---|
| 4,027,821 A | 6/1977 | Hayes et al. | |
| 4,187,687 A | 2/1980 | Savage | |
| 4,222,244 A | 9/1980 | Meckler | |
| 4,285,208 A | 8/1981 | Takeshita et al. | |
| 4,285,211 A | 8/1981 | Clark | |
| 4,327,555 A | 5/1982 | Dimon | |
| 4,586,345 A | 5/1986 | Friberg et al. | |
| 4,691,528 A | 9/1987 | Tongu | |
| 4,748,830 A | 6/1988 | Oouchi et al. | |
| 4,841,744 A | 6/1989 | Kurosawa et al. | |
| 4,993,234 A | 2/1991 | Korsgaard | |
| 5,136,154 A | 8/1992 | Carangelo et al. | |
| 6,109,060 A | 8/2000 | Shimomae et al. | |
| 6,244,062 B1 | 6/2001 | Prado | |
| 6,539,738 B2 | 4/2003 | Gonzalez-Cruz et al. | |
| 6,880,553 B2 | 4/2005 | Liu et al. | |
| 6,957,536 B2 | 10/2005 | Litwin et al. | |
| 6,962,056 B2 | 11/2005 | Brasz et al. | |
| 7,040,278 B2 | 5/2006 | Badgley | |
| 7,340,899 B1 | 3/2008 | Rubak et al. | |
| 7,451,611 B2 | 11/2008 | Muscatell | |
| 7,661,422 B2 | 2/2010 | Liu et al. | |
| 7,735,324 B2 | 6/2010 | Brasz et al. | |
| 7,753,048 B2 | 7/2010 | Liu et al. | |
| 7,810,489 B2 | 10/2010 | Liu et al. | |
| 7,810,490 B2 | 10/2010 | Liu et al. | |
| 8,004,102 B2 | 8/2011 | Rauch et al. | |
| 2004/0031282 A1 | 2/2004 | Kopko | |
| 2005/0183421 A1* | 8/2005 | Vaynberg | F01K 25/08 60/641.8 |
| 2005/0193734 A1 | 9/2005 | Iwanami et al. | |
| 2006/0288720 A1* | 12/2006 | Jmaev | F25B 1/10 62/236 |
| 2006/1028872 | 12/2006 | Jmaev | |
| 2007/0006602 A1 | 1/2007 | Hayashi et al. | |
| 2010/0133820 A1* | 6/2010 | Tsao | F03D 3/00 290/44 |
| 2010/0300095 A1* | 12/2010 | Sakurai | F03G 7/04 60/641.7 |
| 2010/0331953 A1 | 12/2010 | Matsuoka et al. | |
| 2011/0296849 A1* | 12/2011 | Benson | F01K 25/10 62/6 |
| 2012/0227425 A1 | 9/2012 | Poerio | |

FOREIGN PATENT DOCUMENTS

| | | |
|---|---|---|
| EP | 1772687 | 3/2011 |
| EP | 2330280 | 6/2011 |
| GB | 2062215 | 5/1981 |
| JP | 04281398 | * 10/1992 |
| WO | WO2008149284 | 12/2008 |
| WO | WO2009153143 | 12/2009 |

* cited by examiner

| MODE | SWITCH POSITION | | | | |
|---|---|---|---|---|---|
| | | MOTOR | COMPRESSOR | PUMP | TURBINE |
| START-1 | MOTOR | CLUTCH | CLUTCH | CLUTCH | CLUTCH |
| | ON | ON-ENGAGED | OFF | ON-ENGAGED | OFF |
| START-2 | MOTOR | CLUTCH | CLUTCH | CLUTCH | CLUTCH |
| | ON | ON-ENGAGED | OFF | ON-ENGAGED | ON-ENGAGED |
| START-3 | MOTOR | CLUTCH | CLUTCH | CLUTCH | CLUTCH |
| | ON | ON-ENGAGED | ON-ENGAGED | ON-ENGAGED | ON-ENGAGED |
| START-4/RUN SOLAR | MOTOR | CLUTCH | CLUTCH | CLUTCH | CLUTCH |
| | OFF | OFF | ON-ENGAGED | ON-ENGAGED | ON-ENGAGED |
| RUN - BAD WEATHER | MOTOR | CLUTCH | CLUTCH | CLUTCH | CLUTCH |
| | ON | ON | ON-ENGAGED | OFF | OFF |

FIG. 20

SOLAR TURBO PUMP—HYBRID HEATING-AIR CONDITIONING AND METHOD OF OPERATION

PRIORITY CLAIM

In accordance with 37 C.F.R. 1.76, a claim of priority is included in an Application Data Sheet filed concurrently herewith. Accordingly, the present invention claims priority as a continuation-in-part of U.S. patent application Ser. No. 13/415,108 filed Mar. 8, 2012, which claims the benefit of priority of U.S. Provisional Patent Application No. 61/450,439, filed on Mar. 8, 2011, the entire contents of which is hereby expressly incorporated herein by reference.

FIELD OF THE INVENTION

This invention is directed to using renewable energy, such as solar energy, to operate a heating and cooling system, in particular to an apparatus and method of operating a heating and cooling system by using renewable energy, turbocharging, and storing the renewable energy to provide twenty-four hour, seven days a week, heating and air conditioning.

BACKGROUND OF THE INVENTION

It is well documented that the world is searching for renewable, "Green Energy" solutions to power our economy. We need renewable energy alternatives that reduce the cost for homes and businesses to provide heating and cooling solutions. After performing an analysis of energy usage in homes and businesses it is clear that the majority of energy consumption can be attributed to heating and air conditioning (HVAC). Further review within the heating/air conditioning system shows the compressor of the HVAC system is the largest electrical consumption device within most homes and many businesses.

What is needed in the industry is an apparatus and method of renewable energy solutions for heating/air conditioning HVAC systems. The prior art has failed to contemplate the type of a system.

PRIOR ART

U.S. Publication No. 2006/10288720 discloses a method and apparatus for air conditioning using a primary and an ancillary power source. The disclosed apparatus requires at least two compressors. The disclosure fails to teach the use of a pump on the solar turbine drive system which prohibits the system from generating electricity during the Solar driven HVAC process. The disclosure further fails to define or teach the amount of work needed to drive the compressor or teach the energy balance required to ensure operation. The disclosure also fails to disclose thermal storage or any need for thermal storage.

U.S. Pat. No. 2,952,138 discloses a dual cycle heat powered air conditioning system based on the principal that the amount of heat gained from a cooling cycle can be augmented by adding a small amount of gas, however, the BTU's needed are much more than applying small amounts of gas. In addition, the disclosure teaches that applying small amounts of heat will increase temp and pressure, however, pressure will not be change and the temperature increase is based on gas flow and fluid flow from pump.

U.S. Pat. No. 7,451,611 discloses a solar air-conditioning system that is preferably designed to operate with concentrated solar heat supplemented with solar electric cells/ battery and if necessary, power from an electric utility grid. The unit of heat added or subtracted is a British Thermal Unit ("BTU"), which is defined as the amount of heat to raise one pound of water one (1°) degree Fahrenheit. With excess capacity preferably designed in, unused BTUs can go into reserve for night and cloudy days. The present invention system can use a circulating refrigerant such as, but not limited to, Freon® or ammonia in a cycle of compression and expansion. Solar concentrators can raise temperature and pressure of the refrigerant. The raised temperature can be dissipated to the atmosphere and the refrigerant proceeds to the evaporator coil. The evaporator can be located within a water tank containing an anti-freeze water solution. Preferably, the water tank contains at least approximately 1000 gallons of the anti-freeze water solution. The water is preferably the storage medium. Heat can be added to or extracted from the storage medium by the evaporator coil. This invention is different because no turbocharger is used and batteries are required.

U.S. Published Patent Application No. 2004/0031282 discloses an air conditioning system with thermal storage that is suitable for using solar energy.

U.S. Pat. No. 7,340,899 discloses a solar generator system including a plurality of heat exchangers. The solar generator system includes a plurality of heat exchangers connected to receive incoming liquefied refrigerant under pressure. The number of such heat exchangers is sufficient to collect solar energy sufficient to induce a phase change from a liquid to a gas state. The solar generator system also includes an air motor and an electric generator. The air motor is coupled to the outflow of heated gas from the plurality of heat exchangers. The air motor is rotated by the heated gas. The electrical generator is coupled to the air motor so that rotation of said air motor causes rotation of said generator.

U.S. Pat. No. 6,957,536 discloses systems and methods capable of producing electrical power from solar energy through the use of air cycles without fossil fuel combustion. The system includes a solar receiver, a generator, a compressor, and an expander. The expander is coupled to the generator to drive the generator and coupled to the compressor to drive the compressor. The system uses solar generated heat from the solar receiver to heat compressed air from the compressor. The solar generated heat can be directly transferred from the solar receiver to the compressed air as the compressed air flows through receiver tubes of the solar receiver, or the solar receiver can transfer the solar generated heat to a liquid metal, with the liquid metal transferring thermal energy to the compressed air. The expander receives and expands the heated compressed air to drive the generator to produce electricity, and to drive the compressor.

U.S. Pat. No. 6,880,553 discloses a system for providing buildings with a modular air conditioning system that utilizes solar energy for heating air.

U.S. Pat. No. 6,539,738 discloses a compact solar air conditioning system including a desorber, condenser, an evaporator and an absorber especially suited for tropical climates that includes an air-cooled single-effect absorption machine driven by an array of high performance flat-plate collectors along with a thermal storage tank. The absorption machine uses lithium-bromide as a refrigerant and a water-based absorption fluid. The operation of the compact solar air conditioning system is determined by an optimal control strategy.

U.S. Pat. No. 6,244,062 discloses a solar collector for converting solar radiation to thermal energy and electricity. The collector has an upper cover with a material that is transparent to solar radiation.

U.S. Pat. No. 4,222,244 discloses an air conditioning apparatus that includes a chemical dehumidifier which employs an aqueous hygroscopic solution of glycol and a solar energy collector for use in regenerating the solution. Solar energy absorbed by a solar collector is transferred into a heat storage tank by means of a liquid and is used for regenerating the hygroscopic solution used in the contactor.

U.S. Pat. No. 8,004,102 discloses a microturbine for the generation of mechanical and electrical power having a positive displacement axial vane rotary compressor and an axial expander. The compressor and expander are joined by a common shaft. The system further includes at least one combustor for heating a driving fluid prior to its entering the expander. The driving fluid, such as air, enters the compressor at ambient conditions of pressure and temperature and is compressed. The compressed driving fluid is preheated by the exhaust from the expander, then passes through a combustor to bring its temperature to a desired expander inlet temperature and then enters the expander where the expansion force of the hot driving fluid acting against the vanes of the expander is translated into rotation of the common shaft for driving both the compressor and a suitable power device such as an electrical generator.

U.S. Pat. No. 7,735,324 discloses a machine designed as a centrifugal compressor is utilized and an organic Rankine cycle turbine by operating the machine in reverse.

U.S. Pat. No. 7,040,278 discloses a microturbine for the generation of mechanical and electrical power comprising a compressor and an expander. The compressor and expander are joined by a common shaft with a motor/generator. The system further includes at least one combustor for heating a driving fluid prior to its entering the expander. The driving fluid, such as air, enters the compressor at ambient conditions of pressure and temperature and is compressed. The compressed driving fluid is preheated by the exhaust from the expander, then passes through a combustor to bring its temperature to a desired expander inlet temperature and then enters the expander where the expansion force of the hot driving fluid acting against the expander is translated into rotation of the common shaft for driving both the compressor and a suitable power device such as an electrical generator.

U.S. Pat. No. 6,962,056 discloses a centrifugal compressor designed for compression of refrigerants for purposes of air condition including a Rankine cycle system that is combined with a vapor compression cycle system with the turbine generator of the organic Rankine cycle generating the power necessary to operate the motor of the refrigerant compressor. The vapor compression cycle is applied with its evaporator cooling the inlet air into a gas turbine, and the organic Rankine cycle is applied to receive heat from a gas turbine exhaust to heat its boiler within one embodiment, a common condenser is used for the organic Rankine cycle and the vapor compression cycle, with a common refrigerant, R-245A being circulated within both systems. In another embodiment, the turbine driven generator has a common shaft connected to the compressor to thereby eliminate the need for a separate motor to drive the compressor.

U.S. Pat. No. 4,841,744 discloses a double effect air cooled absorption refrigeration machine including fans provided on one side frame member out of the upper, lower and four side frame members which constitute a frame machine body, an air cooled heat exchanger provided on the remaining three side frame members.

U.S. Pat. Nos. 4,748,830, 4,691,528, 4,285,211, and 4,285,208 disclose absorption type refrigeration systems.

U.S. Pat. Nos. 6,109,060, 5,136,154, 3,605,436, 3,552, 142, 3,491,545, and 1,944,908 disclose refrigeration and air conditioning systems.

U.S. Pat. Nos. 7,801,490, 7,810,489, 7,753,048, 7,661, 422, 4,993,234, 4,586,345, 4,327,555, 4,187,687, and 4,027, 821 disclose solar collectors utilized in air conditioning systems.

SUMMARY OF THE INVENTION

The world is searching for renewable, "Green Energy", solutions to power our global economies. The present invention focuses on reducing the electrical consumption for heating and air conditioning systems by limiting the use of the compressor to bad weather days only. The system of the present invention can provide heating and air conditioning every day for twenty-four hours a day, depending on the ability to use the sun to heat the refrigerant.

The present invention is unique in many ways. One example is that it does not require the home owner or business owner to replace their existing HVAC system. The present invention can be add-on module or it can replace the existing portion of the HVAC system which is outside of the building (the condenser and compressor). This add-on module is a low cost renewable energy alternative to conventional HVAC systems. Previous approaches to solve this problem included adding photo-voltaic roof panels to power the heating/air conditioning compressor. The present invention eliminates the need to power the compressor utilizing conventional power sources. The present invention utilizes energy from the sun to perform the work previously done by the electrically operated compressor, by using a turbocharged pump and solar collector to heat refrigerant utilized in existing HVAC systems. A electric motor is used to operate the outside compressor when there is not sufficient energy from the storage of thermal energy to operate the compressor. The system can also operate and a hybrid system utilizing a variable speed electric motor to operate the compressor. The present invention includes thermal energy storage to provide energy from 5 PM to 8 AM or when solar energy is not available.

The present system utilizes a solar refrigerant turbocharger and pump in conjunction with a solar collector to harness the sun's energy. This invention uses the liquid pump within the solar turbocharger to boost the refrigerant pressures into the solar collector, next the refrigerant absorbs heat inside the solar collector and changes phase from a liquid to a vapor. The vapor is expanded across the turbine causing the turbine to spin. The turbine is connected to both the liquid pump and a compressor and starter motor/generator. The ability of the refrigerant to change phase or flash from a liquid to a vapor is due to the solar energy that is transferred from evacuated tubes into the solar collector manifold and into the refrigerant. The rate and ability to flash inside the solar collector is directly related to the length and number of solar evacuated tubes and can also be increased by adding a compound parabolic concentrator (CPC) and or a Fresnel lens. The gas is routed to the solar turbo pump turbine to drive the compressor and liquid pump and starter motor/generator. The resulting fluid gas leaving the turbine is routed to the condenser for normal operation. The result is a closed loop system consisting of a liquid pump, turbine, condenser and solar collector that drives a compressor that can be used for any system to provide as an energy free source for compression. This solution can be tied into the current users heating/air conditioning air-handling systems condenser or an additional condenser can be included in the solar turbo pump collector hybrid modular unit. The solar turbo pump can be sized to increase the discharge pressure of the exit refrigerant from the turbocharger to the condenser by changing the match between the compressor, turbine and liquid pump size, changing the compressor and turbine trims and the (Area to Rod) A/R ratio. The discharge volutes can also be reduced or increased to set the desired pressure. A downstream flow control can also be added to set the solar turbocharged collector exit pressures.

A preferred embodiment of the present invention relies on the transfer of the sun's renewable energy into the refrigeration fluids as defined by ASHRAE US refrigeration standards founded in 1894, including Freon® and liquid CO2, in the form of heat. Adding heat to the refrigerant fluids, including Freon®, causes the fluid temperature to rise and thereby flash or change phase from a liquid to a gas enabling the vapor to be expanded across a turbine generating enough power to supply to both the liquid pump and run a compressor.

Accordingly, it is an objective of the present invention is to use a renewable energy to operate a HVAC system in a home or business.

It is a further objective of the present invention to utilize a modular thermal storage unit to eliminate the need for the refrigerant compressor of a HVAC system.

It is a further objective of the present invention is to lower the cost for utilities by providing a modular solar turbo-hybrid heating and or air conditioning solution. This solution permits the user to use existing heating/air conditioning equipment for minimal expense or it can be integrated into a newer system.

It is still a further objective of the present invention to provide a system for use with a conventional HVAC system wherein solar collectors are connected in series and draw water from a stratified storage tank through a manifold. The stratified storage tank draws the heated fluid to drive a refrigeration loop from a layer within the tank having a highest temperature. When its temperature is insufficient to drive the refrigeration loop, the water is passed through a heater positioned between the storage tank and the absorption machine.

It is still yet a further objective of the present invention to employ a system for utilizing renewable energy to operate in which an air-cooled condenser and air-cooled absorber employ parallel copper tubes having aluminum fins.

Still another objective of the invention is to provide users in cold weather climates with a solar powered heat source. The heat source includes a solar turbo-collector that is connected to a condenser/evaporator system. The heat source works when the refrigerant is exposed to heat from solar turbo pump collector to operate a typical HVAC system without requiring a compressor.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

BRIEF DESCRIPTION OF THE DRAWINGS

FIG. 20 is a chart of an alternate approach for the different starting modes of the turbine of the present invention. The baseline approach for starting is to not include a clutch system and have the starter motor/generator 72 drive the turbine, liquid pump, compressor all mechanically connected to shaft 42.

DETAILED DESCRIPTION OF THE INVENTION

Figure 1:
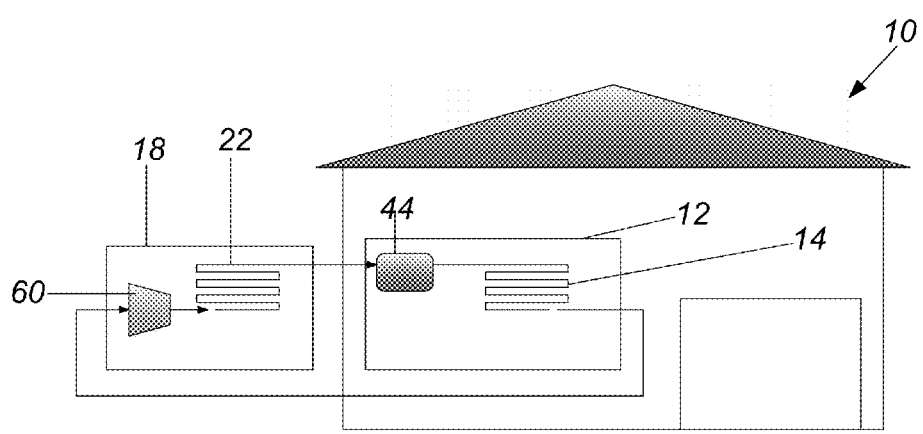
FIG. 1 is a conventional HVAC system in a home or business.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIGS. 1-20, which are now referenced and have been revised, illustrate the prior art, the present invention, and the manner in which the present invention is operated. Upon determination of the correct heating/air conditioning requirements, the system of the present invention can be attached to a user's existing air handling heating/air conditioning system. The present system utilizes a solar refrigerant turbocharger and pump in conjunction with a solar concentrator/collector 56 to harness the suns energy. A liquid pump 52 within the solar turbocharger boosts the refrigerant pressures into the solar concentrator/collector 56, where the refrigerant absorbs heat and changes phase from a liquid to a vapor. The vapor is expanded across the turbine/expander 58 causing the turbine/expander 58 to spin. The turbine/expander 58 is connected to both the liquid pump 52 and the compressor 60 and a motor/generator 72 by a shaft 42. The ability of the refrigerant to change phase or flash from a liquid to a vapor is due to the solar energy that is transferred from the evacuated tubes 88 (FIG. 15) into the integral manifold 78 (FIG. 9) and into the refrigerant. The rate and ability to flash inside the solar concentrator/collector 56 is directly related to the length and number of solar evacuated tubes 88 and can also be increased by adding a compound parabolic concentrator (CPC) 90 (FIG. 16) and/or a Fresnel lens 92 (FIG. 17). The gas is routed to the turbine/expander 58 to drive the liquid pump 52 and the single compressor 60 and motor/generator 72 by a shaft 42. The resulting fluid gas leaving the turbine/expander 58 is routed to the condenser 54 for normal operation. The result is a closed loop system comprising a liquid pump 52, solar concentrator/collector 56, turbine/expander 58, and condenser 54 that drives the compressor 60 and motor/generator 72 of an existing air handling circuit of a heating/air conditioning system to provide an energy free source for compression. The system can also can generate electricity during the solar powered renewable heating/air conditioning operation. The system within the box 24 (FIGS. 2 and 3) can be sized to increase the discharge pressure of the exit refrigerant from the turbine/expander 58 to the condenser 54 by changing the match between the compressor 60, turbine/expander 58, and liquid pump 32 size; changing the compressor 60 to turbine/expander 58 trims; and by changing the area-to-rod (A/R) ratio. The discharge volutes can also be reduced/increased to set the desired pressure. A downstream flow control can also be added to set the solar concentrator/collector 56 exit pressures.

FIG. 1 illustrates a conventional air-conditioning system of the prior art installed in a home or business 10. An air handler 12 is installed inside of the home or business 10. The air handler 12 includes an evaporator 14 and a metering device 44. The evaporator 14 cools the air within the home or business by expansion of a refrigerant within the evaporator 14 and changing of the refrigerant from a liquid to a gas. This change of state of the refrigerant results in a release of energy. The most popular refrigerants utilized in convention air-conditioning systems are Freon® R22, R12, 410A, R134A, and more recently Freon® R245FA. Subsequent to the air within the building being cooled by passing over the evaporator 14, the refrigerant is sent to the outside unit 18. The outside unit 18 includes a compressor 60 and a condenser 22. The gaseous refrigerant from the evaporator 14 is passed through the compressor 60. In the compressor 60 the gas is highly compressed. At this point energy is added to the system from the compressor 60 which in normally electrically powered. A large amount of electricity is required to operate the compressor to compress the gaseous refrigerant. Next the compressed gas is passed into the condenser 22 where it changes from a gas to a liquid by releasing heat into the atmosphere. From the condenser 22 the liquid refrigerant is passed through a metering device 44 into the evaporator 14 and the cooling cycle is repeated. Because the compressor 60 requires large amount to electricity to operate, this one device consumes a vast majority of electricity utilized by a home or business. The present invention reduces the need for this electricity.

Figure 2:
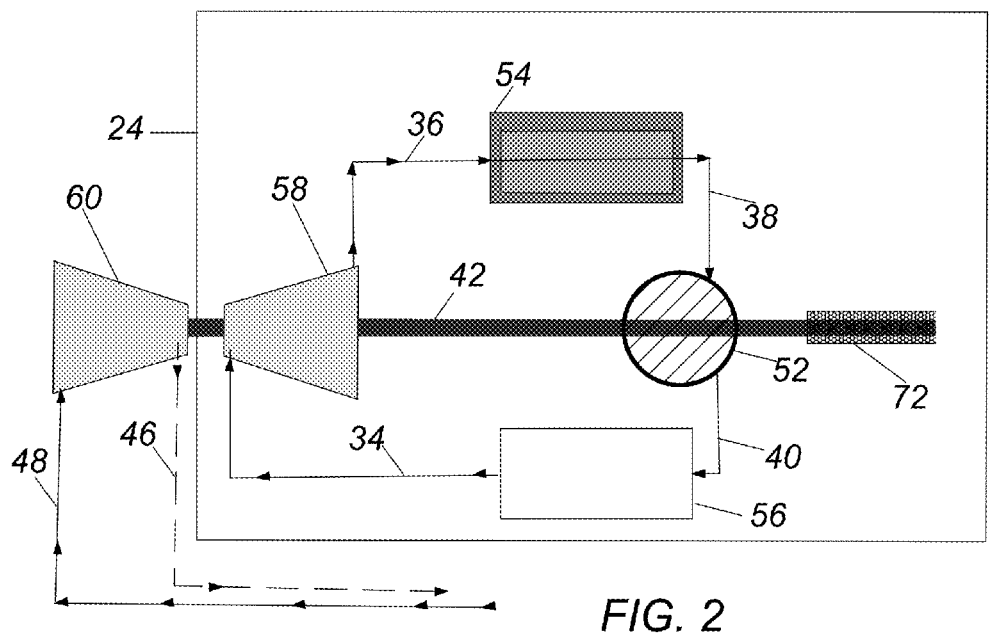
FIG. 2 is a system schematic of the present invention adaptable to any system.

FIG. 2 illustrates a schematic diagram of a basic system of the present invention. This can also be considered to be a preferred embodiment of the present invention. The system within the box 24 is a closed loop system. It includes a solar concentrator/collector 56, a turbine/expander 58, a condenser 54, and a liquid pump 52 and a starter motor/generator 72. There are also fluid connections 34, 36, 38, and 40 between the solar concentrator/collector 56, the turbine/expander 58, the condenser 54, and the liquid pump 52 respectively. The fluid entering the solar concentrator/collector 56 is a liquid. It changes into a gas in the solar collector/condenser 56 and drives the turbine/expander 58. When the gas expands in turbine/heat expander 58, work is extracted. A shaft 42 is connected to the turbine/expander 58, the liquid pump 52 and a compressor 60 and motor/generator 72. The work from the turbine/expander 58 drives both the liquid pump 52 and the compressor 60. The fluid in the Solar drive closed loop system 24 is a refrigerant, such as Freon® R134A or R245fa. Compressor 60 is a part of a conventional HVAC system. A gaseous refrigerant, such as Freon®, is fed into the compressor 60 through fluid line 48 from a conventional HVAC system. Compressed refrigerant leaves the compressor 60 and is fed into the conventional HVAC system through fluid line 46. Since the shaft 42 drives the compressor 60 and motor/generator 72 is available but not required to operate the compressor 60. Because an electric motor normally operates the compressor 60, a substantial cost savings is achieved by elimination of the electric motor. Additionally, the equipment within the box 24 is assembled with a compressor as a module 50 which can be readily added-on to an existing HVAC air-handling system. Therefore, replacement of the existing HVAC system is not required resulting in another substantial cost savings. Prior to installation of the present invention, an assessment of the existing building an HVAC is conducted. This assessment includes blower door tests for air leakage, in addition to other tests, to determine the lowest cost embodiment of the present invention to install with their existing HVAC system. Once the heating/air conditioning requirements have been determined, it is relatively simple to connect the present invention to the existing HVAC system. The refrigerant of the system of the preferred embodiment operates below 300° F.

Figure 3:
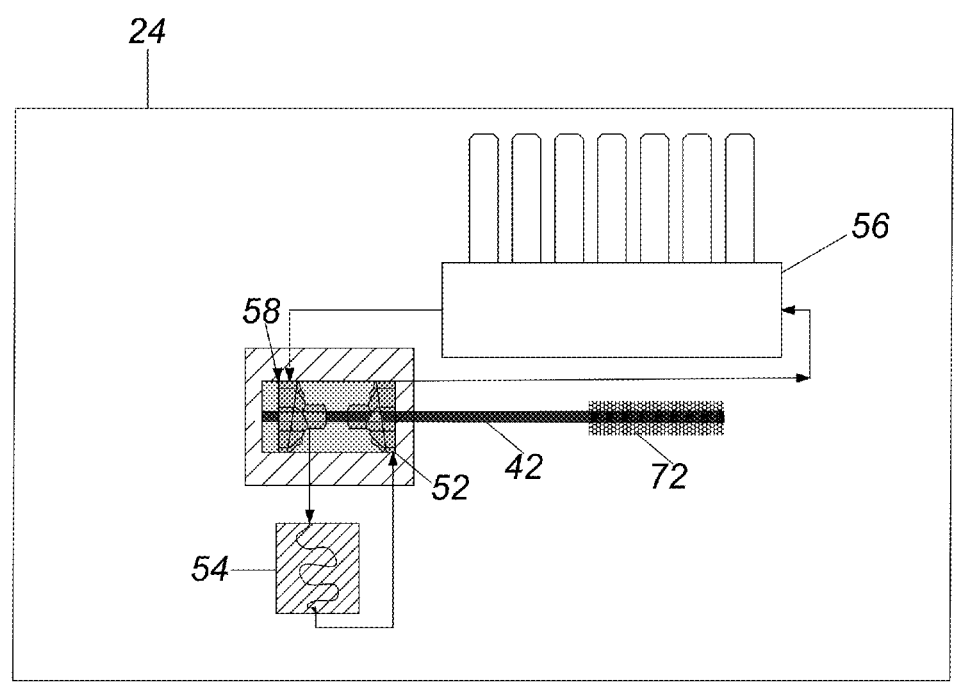
FIG. 3 is system schematic of a closed loop system using Freon® to drive a Solar turbine pump drive system.

Another embodiment of the present invention is illustrated in FIG. 3. In this embodiment the liquid pump of FIG. 2 is a liquid pump 52. Refrigerant, such as Freon® R134 or R254fa or other refrigeration fluids (defined by ASHRAE US refrigeration standards founded in 1894) is circulated with in the closed loop system 24. The liquid pump 52 pumps the liquid refrigerant from the condenser 54 to the solar collector 56. In one, non-limiting, example liquid refrigerant enters the liquid pump 52 at 100 psi and 75° F. The refrigerant leaves the liquid pump 52 at 500 psi and 75° F. The solar collector 56 heats the refrigerant to 500 psi and 170° F. by using solar energy from the sun. Details of the solar collector 56 will be set forth herein after. From the solar collector 56 the refrigerant is fed into the turbine 58 where it drives the turbine 58, as explained in the embodiment of FIG. 2. This module 50 can also be readily added-on to an existing HVAC system.

Figure 4:
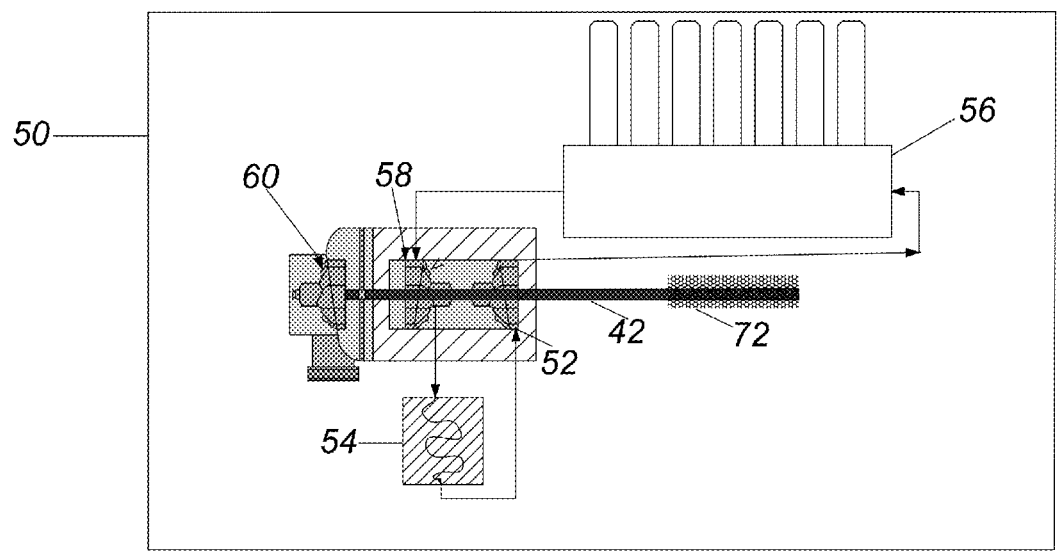
FIG. 4 is system schematic of closed loop Solar turbine pump drive system including the compressor and motor/generator 72, the outline indicates a modular unit.

FIG. 4 is another embodiment of the present invention. This embodiment is similar to the embodiment of FIG. 3. Additionally, any type of compressor 60 is connected to the turbine 58. The turbine 58 drives the compressor 60.

Figure 5:
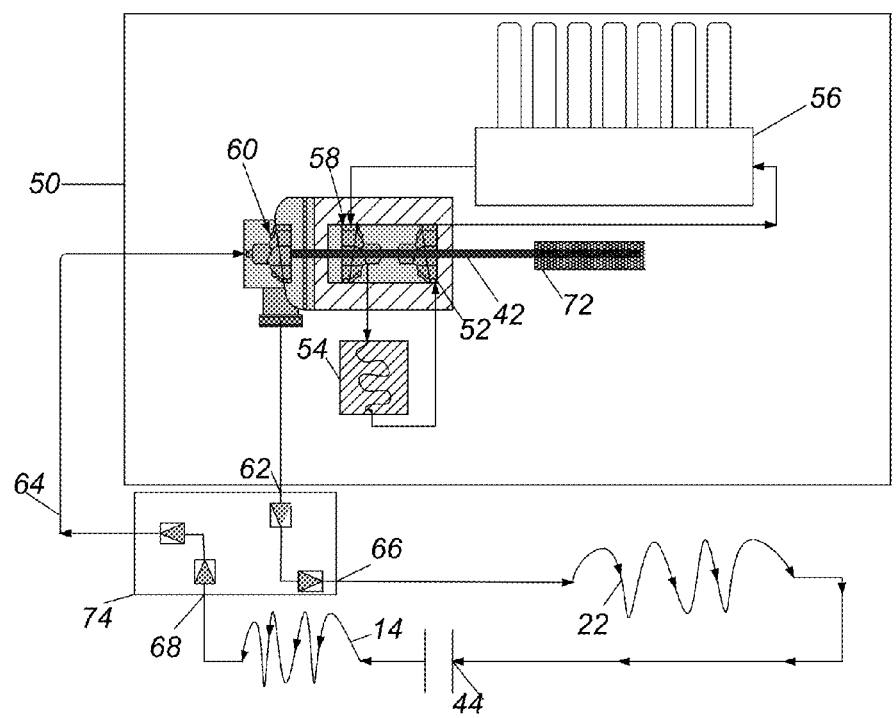
FIG. 5 is system schematic of closed loop turbo pump drive system including the compressor and interface connections with existing or new systems, the outline indicates a modular unit.

FIG. 5 illustrates how the system illustrated in FIG. 4 can be connected to a conventional HVAC Air Handling system utilizing the existing air handling equipment of the HVAC system. The air handling system of a conventional HVAC system is similar to the system described in FIG. 1. An evaporator 14 cools the air with the house or building. Our Solar drive system includes solar collector 56 and thermal storage 78, and turbine 58, and liquid pump 52, and condenser 54, and motor/generator 72 all mechanically connected to shaft 42 driving a single compressor 60 also on shaft 42. The refrigerant, which is a gas at this point. From the single compressor 60 the refrigerant is liquefied in condenser 22 and then sent to a metering valve 44 then sent to the evaporator 14. The module 50 of the present invention can be connected to an air-handling section of the conventional HVAC system.

Figure 6A:
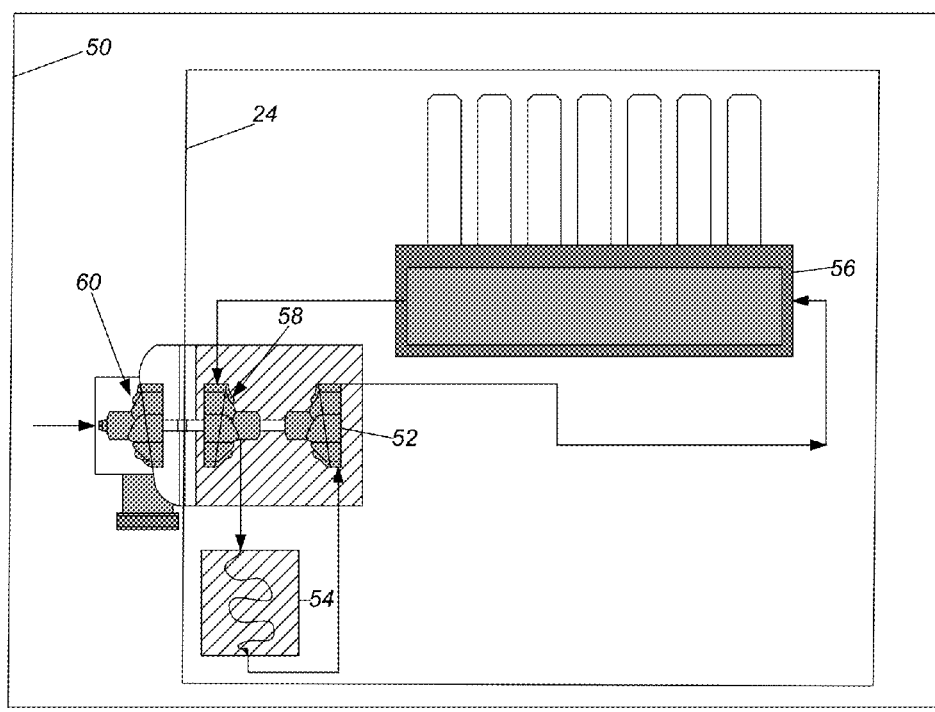
FIG. 6A is a minimal sizing of a solar turbo-pump collector, including conditions during operating that would not require energy to be consumed by a compressor.

FIG. 6A is the module 50 of the present invention without illustrating the conventional HVAC system in FIG. 5. In this embodiment Freon® R22 or any authorized refrigerant (found in ASHRAE US refrigeration standards founded in 1894) is utilized as the refrigerant in the convention al HVAC system. The gaseous refrigerant in the conventional system enters the compressor 60 at 75 psi and 45° F. to 65° F. The refrigerant leaves the compressor 60 at 150 to 235 psi and 113° F. This refrigerant in the solar turbine drive closed loop of the present invention can be Freon® R134A or R245fa or other authorized refrigerant (found in ASHRAE US refrigeration standards founded in 1894). This embodiment indicates the minimum size of the present invention that is required to operate with a conventional HVAC air-handling system.

Figure 6B:
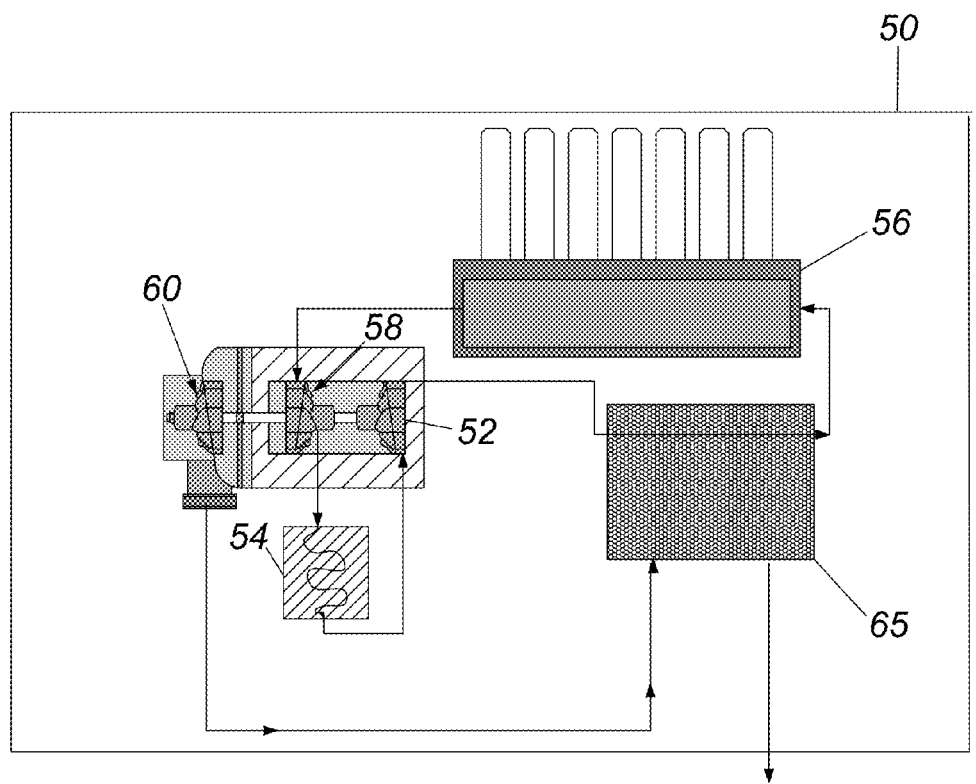
FIG. 6B is another embodiment of the present invention as illustrated in FIG. 6A.

FIG. 6B is another embodiment of the module 50 of the present invention without illustrating the conventional HVAC system. In this embodiment hot liquid refrigerant, such as Freon®, enters the solar collector 56. Heat supplied from the sun enters the solar collector 56 and is hot enough to boil the refrigerant. The liquid refrigerant then changes state into a vapor in the solar collector 56. On initial system startup a started motor is used to operate the liquid pump 52, the turbine and the compressor 60. The vaporized refrigerant from the solar collector 56 bypasses the turbine 58 and it sent to the condenser 54 during startup. After the system has been operated for a period of time and there is adequate boiling and evaporation of the refrigerant, the refrigerant no longer bypasses the turbine 58, but rather is sent directly to the turbine 58. The vapor is expanded supersonically through the turbine nozzle which causes the blades of the turbine 58 to spin. The turbine then drives the liquid pump 52 and compressor 60 and motor/generator 72 which can produce electricity during solar driven HVAC operation. The vaporized refrigerant is condensed back into a liquid in condenser 54 and sent to liquid pump 52. From liquid pump 52 the liquid refrigerant is sent back to the solar collector 56. In this embodiment a heat exchanger 65 is utilized to pre-heat the liquid refrigerant prior to it entering the solar collector 56. In this manner it also generates the pressure which drives the entire cycle. Heat exchanger 65 also acts as a condenser to enable the refrigerant used in the air conditioning system of the home or business 10 to condense after it leaves the compressor 60 without using a fan, as the conventional systems do.

Figure 7:
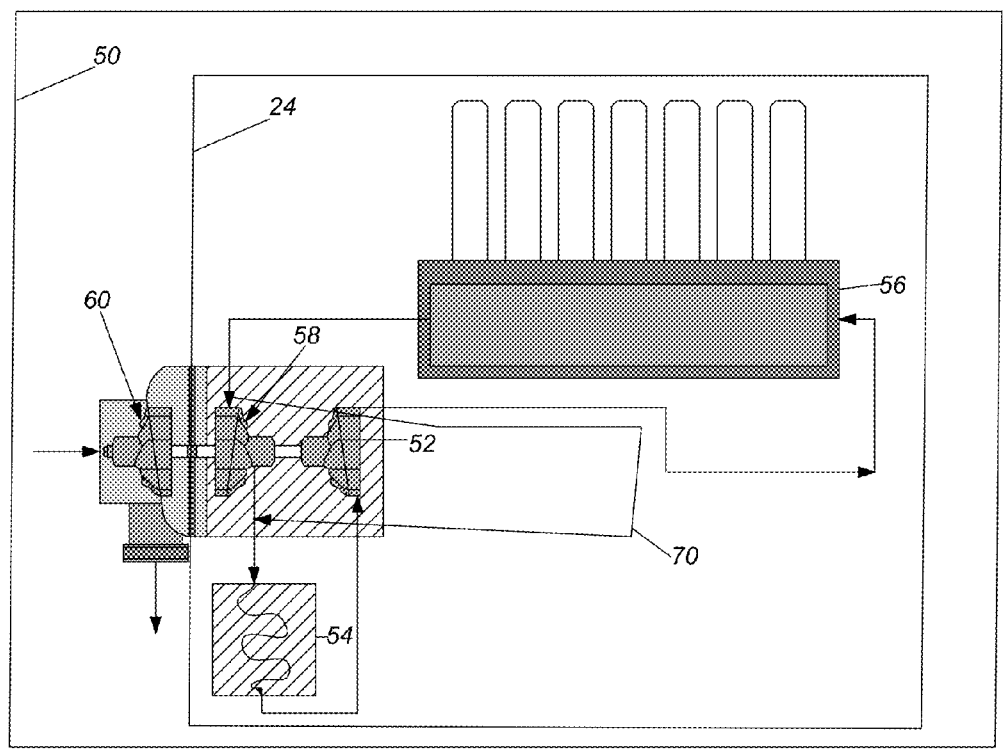
FIG. 7 is a start schematic utilizing a minimal sizing of a solar turbo pump collector, the system will start using a bypass valve system and starter motor.

FIG. 7 is the module 50 of the present invention in a "start mode" without illustrating the conventional HVAC system in FIG. 5. In this embodiment Freon® R22 or any authorized refrigerant (found in ASHRAE US refrigeration standards founded in 1894) is utilized as the refrigerant in the conventional HVAC system. The gaseous refrigerant in the conventional system enters the compressor 60 at 75 psi and 45° F. to 65° F. The refrigerant leaves the compressor 60 at 150 to 235 psi and 113° F. In this "start mode" the refrigerant in the closed loop system 24 of the present invention, after it leaves the solar collector 56, bypasses the turbine 58 in line 70 until there is adequate pressure within the closed loop system 24 for it to operate. A starter motor is used to spin the liquid pump until the turbine has adequate pressure to take over operation by itself. The length of time that the started motor operate is dependent on the length of the refrigerant line. The amount of time the starter motor operates is dependent on the fluid line lengths and should be limited to not exceed 30 seconds.

Figure 8:
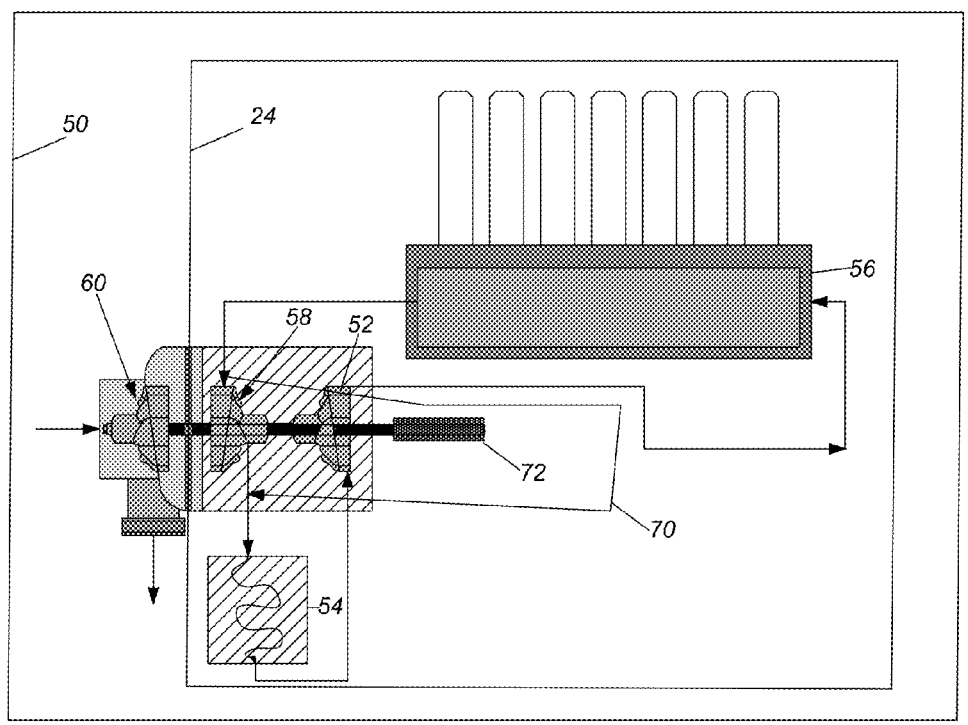
FIG. 8 is a start schematic for the present system, illustrating how the system will start using a starter motor used to generate liquid pressure.

FIG. 8 is the module 50 of the present invention in a "start mode" without illustrating the conventional HVAC air-handling system in FIG. 5. In this embodiment Freon® R22 or any other authorized refrigerant (found in ASHRAE US refrigeration standards founded in 1894) is utilized as the refrigerant in the convention al HVAC system. The gaseous refrigerant in the conventional system enters the compressor 60 at 135 psi and 45° F. to 65° F. The refrigerant leaves the compressor 60 at 270 to 350 psi and 113° F. or if Freon® R245fa is used, the refrigerant can leave the compressor at a pressure as low as 100 psi. In this "start mode" the refrigerant in the closed loop system 24 of the present invention, after it leaves the solar collector 56, bypasses the turbine 58 through fluid line 70 until there is adequate pressure within the closed loop system for it to operate. Additionally, there is a starter motor/generator 72 which operates the liquid pump 52 until the closed loop system can operate on its own. The starter motor/generator 72 can be a variable speed motor. The baseline start mode does not utilize clutches to disengage the shaft 42. An illustration of alternate baseline starting modes of the present invention are illustrated in FIG. 20.

Figure 9:
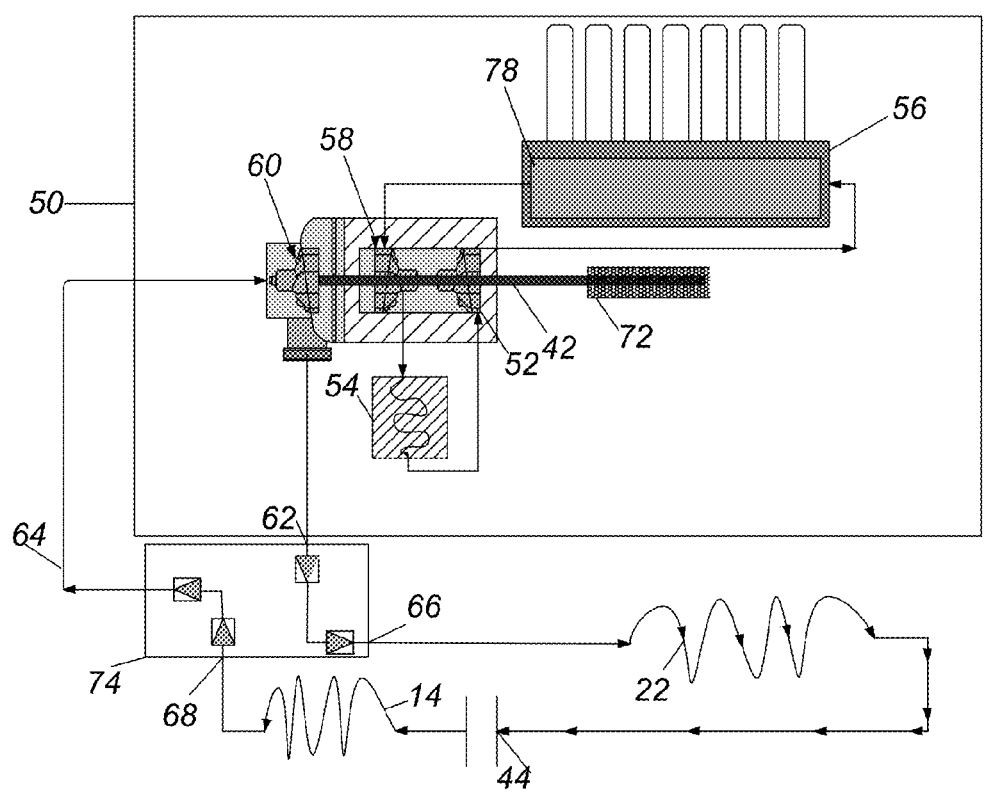
FIG. 9 is a system schematic employing a low cost solution including thermal storage located in the solar collector manifold and using existing equipment.

FIG. 9 is the present invention in an embodiment similar to the one illustrated in FIG. 5. The conventional HVAC system is similar to the system described in FIG. 1. An evaporator 14 cools the air with the house or building. A single compressor 60 compresses the refrigerant, which is a gas at this point. From the compressor 60 the refrigerant is liquefied in condenser 22 and then sent to metering valve 44 and then sent to the evaporator 14. The module 50 of the present invention can be connected to the conventional air handling section of an HVAC system at two points. The solar collector 56 is equipped with an integral manifold 78 for thermal storage of the energy used to vaporize the liquid refrigerant in the closed loop. The thermal storage of energy is especially useful from 5 PM to 6 AM when there is little or now sun. Also this thermal storage is useful on days when there is very little sun, such as in rain, snow and other bad weather.

Figure 10:
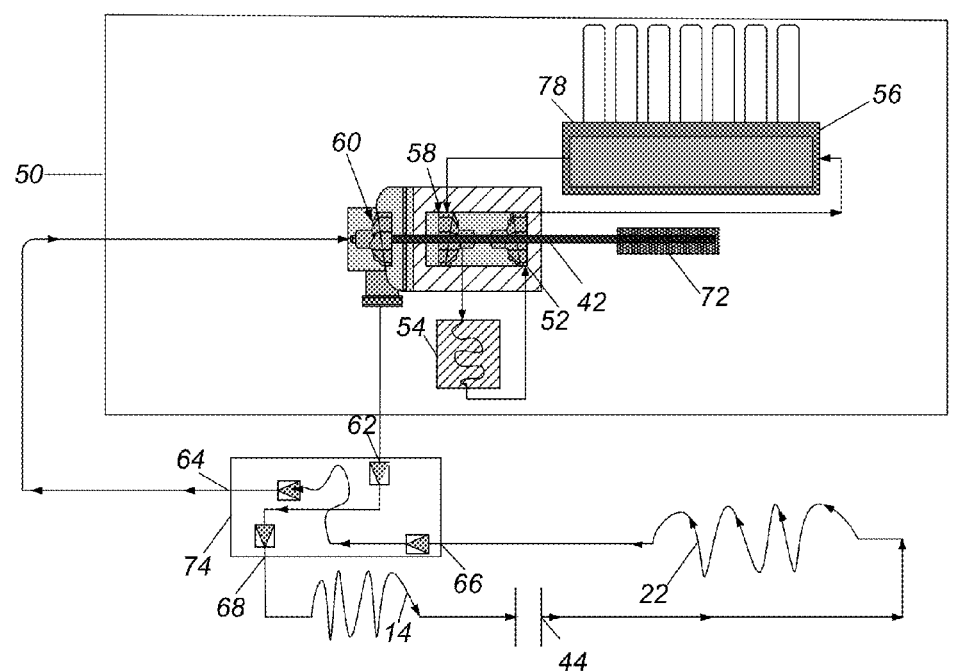
FIG. 10 is a system schematic of a reversible heating or air conditioning system. This shows the discharge of the compressor can be routed to the condenser or evaporator. The outline indicates what is in a modular unit.

FIG. 10 is the present invention in an embodiment similar to the one illustrated in FIG. 9. In the embodiment of FIG. 9, the conventional HVAC system is operating as a heat pump. The conventional HVAC system is similar to the system described in FIG. 1. An evaporator 14 cools the air with the house or building. A compressor 60 compresses the refrigerant, which is a gas at this point. From the compressor 60 the refrigerant is liquefied in condenser 22 and then sent to metering valve 44 and then sent to the evaporator 14. The module 50 of the present invention can be connected to the conventional HVAC air handling system at two points. A "T" connection 66 removes part of the gaseous refrigerant from the convention system and sends it to the compressor 60. There is also a four-way valve 74 in the fluid line between the connection 62 and compressor 60 and connection 64 and compressor 60. After the refrigerant has been compressed in the compressor it is sent back into the conventional HVAC system at a connection 62. The solar collector 56 is equipped with an integral manifold 78 for thermal storage of the energy used to vaporize the liquid refrigerant in the closed loop.

Figure 11:
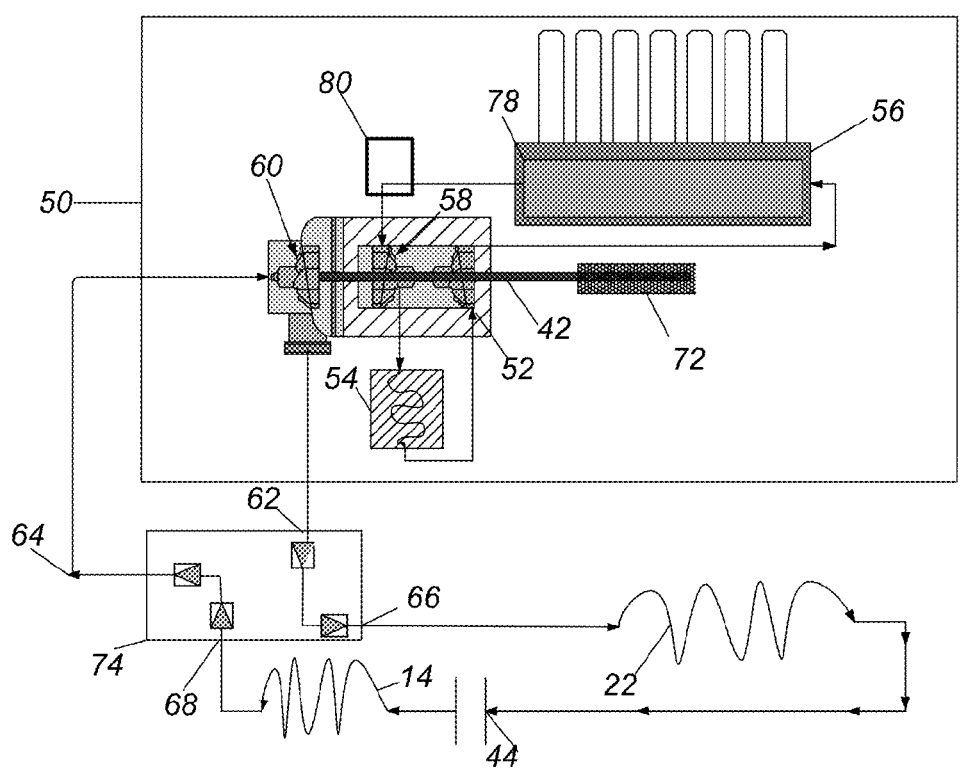
FIG. 11 is a system schematic that includes optional thermal storage locations. This illustration show thermal storage residing in the evacuated tubes and/or a self-contained thermal storage system. The outline indicates what is in a modular unit.

FIG. 11 is the present invention in an embodiment similar to the one illustrated in FIG. 9. In this embodiment there is an optional thermal storage module. The conventional HVAC system is similar to the system described in FIG. 1. An evaporator 14 cools the air with the house or building. A compressor 60 compresses the refrigerant, which is a gas at this point. From the compressor 60 the refrigerant is liquefied in condenser 22 and then sent to metering valve 44 and then sent to the evaporator 14. The module 50 of the present invention can be connected to the conventional HVAC air handling system at two points. A connection 62 removes part of the gaseous refrigerant from the convention system and sends it to the compressor 60. After the refrigerant has been compressed in compressor 60 it is sent back into the conventional HVAC air handling system at connection 62. The solar collector 56 is equipped with an integral manifold 78 for thermal storage of the energy used to vaporize the liquid refrigerant in the closed loop. There is also a thermal storage module 80 for additional storage of the energy used to vaporize the liquid refrigerant in the closed loop.

Figure 12:
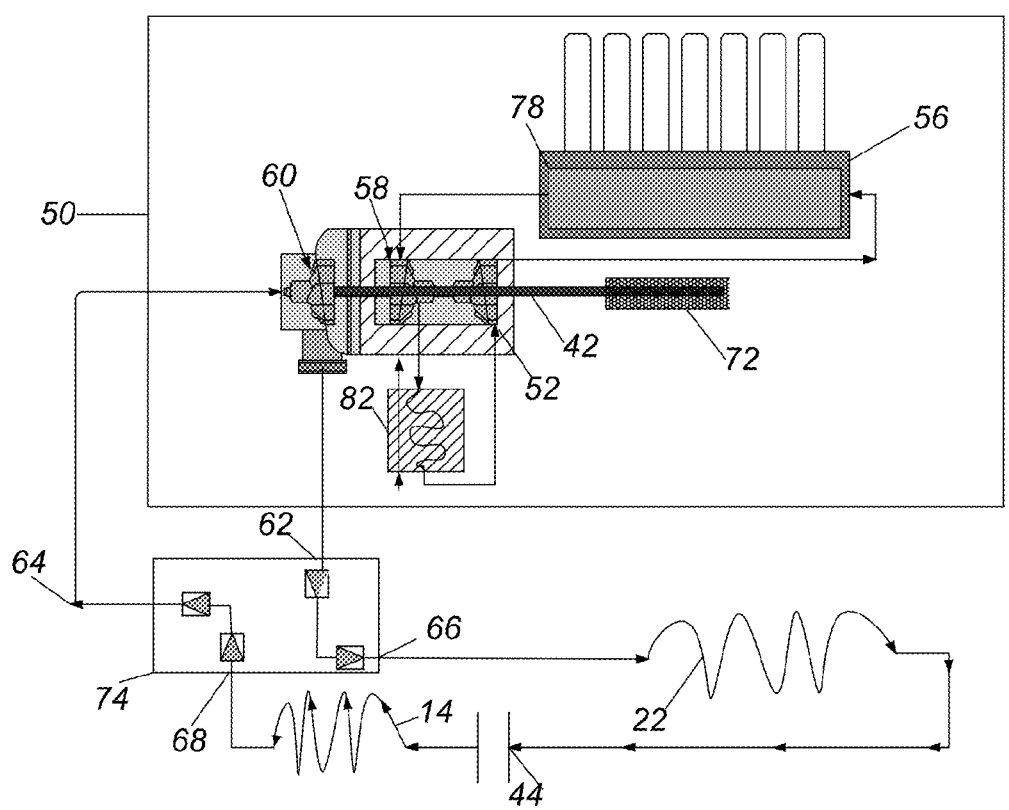
FIG. 12 is a system schematic defining an optional drive system with a water cooled condenser that can also be a water heater source. This illustration shows thermal storage residing in the solar collector manifold. This unit includes an additional condenser that can be used to heat water by cooling the refrigerant and/or turbo. The outline indicates what is in a modular unit.

FIG. 12 is the present invention in an embodiment similar to the one illustrated in FIG. 9. In this embodiment there is a solar water heater/condenser. The conventional HVAC system is similar to the system described in FIG. 1. An evaporator 14 cools the air with the house or building. A compressor 60 compresses the refrigerant, which is a gas at this point. From the compressor 60 the refrigerant is liquefied in condenser 22 and then sent to metering valve 44 then sent to the evaporator 14. The module 50 of the present invention can be connected to the conventional HVAC system at two points. A connection 62 removes part of the gaseous refrigerant from the convention system and sends it to the compressor 60. After the refrigerant has been compressed in compressor 60 it is sent back into the conventional HVAC air handling system at connection 62. The solar collector 56 is equipped with an integral manifold 78 for thermal storage of the energy used to vaporize the liquid refrigerant in the closed loop. The integral manifold 78 can contain thermal storage media, such as PCM-phase change materials, including salts and water based fluids. The condenser 54 is equipped with a solar water heater/condenser 82.

Figure 13:
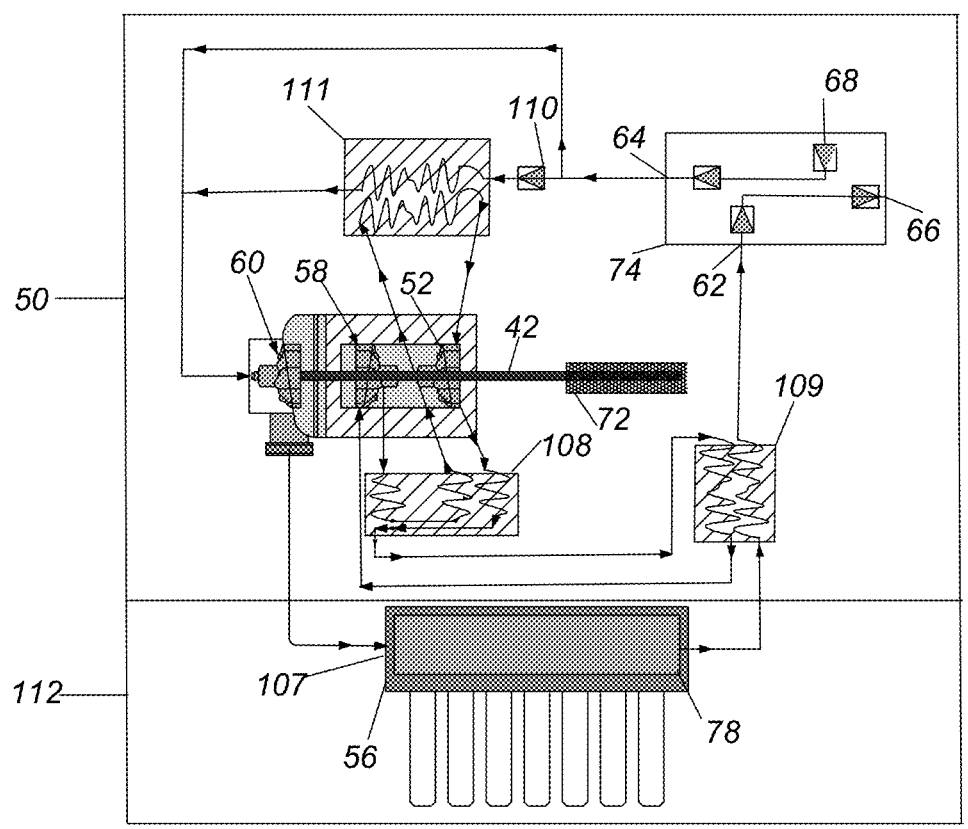
FIG. 13 is a system schematic including an additional condenser for those applications that do not want to tie into the existing users' condenser. The outline indicates what is in a modular unit.

FIG. 13 is a system schematic including a solar collector and three hybrid heat exchangers/condensers. FIG. 13 is the present invention in an embodiment similar to the one illustrated in FIG. 9. An evaporator cools the air within the house or building. A single compressor 60 compresses the refrigerant, which is a gas at this point then sent to a solar collector 56 at connection 107 for additional heat. The super heated gas is then sent to hybrid heat exchanger/condenser 109 to exchange heat from fluid 1 to drive fluid 2. This does two things, it uses the large differential temperature to ensure the fluid 1 changes from a gas to liquid without using a condenser fan (no need for electricity) and transfers the heat gained from the solar concentrator back into fluid 2 as a pre-heat measure before entering the solar collector. Fluid 2 leaves condenser 109 as a fluid and is then sent to connection point 62 and four-way valve 74 before being sent to the metering valve and then to the evaporator.

Our Solar drive system defined previously defined in FIG. 5 also includes two hybrid heat exchangers. The drive fluid 2 leaving turbine 58 is used to pre-heat the liquid leaving liquid pump 52 in heat exchanger/condenser 108, in order to guarantee the fluid leaving the turbine becomes liquid it is in contact with a hybrid heat exchanger/condenser 108 and also sent to hybrid heat exchanger 111. Heat exchanger/condenser 111 uses return cold gaseous fluid from 74 to create a heat sink and ensure fluid entering liquid pump 52 is in a liquid phase. The amount of heat sink can be controlled by a bypass valve 110, too much heat sink will cause the system to require more drive system heat. The outline indicates what is in a modular unit; 50 and 112.

Figure 14:
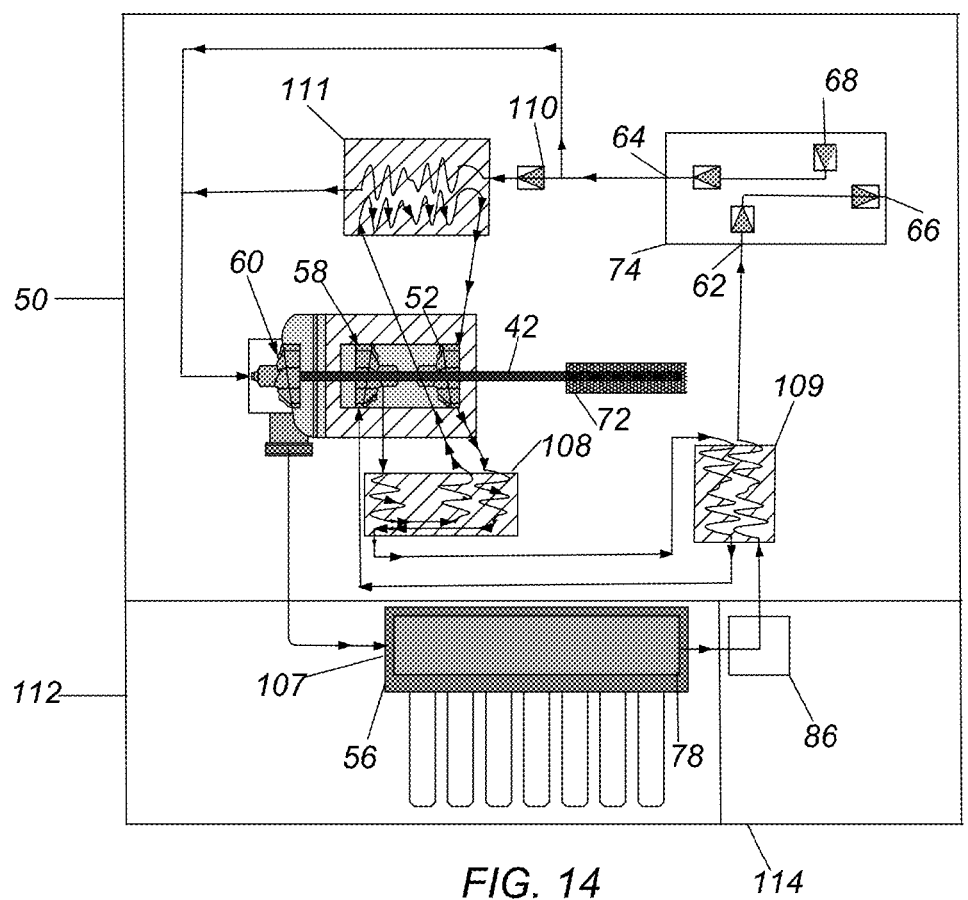
FIG. 14 is a system schematic including three hybrid heat exchangers/condensers, a solar collector and modular thermal storage for those applications that do not want to tie into the existing users' condenser. The outline indicates what is in a modular unit.

FIG. 14 is a system schematic as defined in FIG. 13 including a modular thermal storage 86 for those applications that do not want to tie into the existing users' condenser. The outline indicates what is in a modular unit; 50, 112, and 114.

Figure 15:
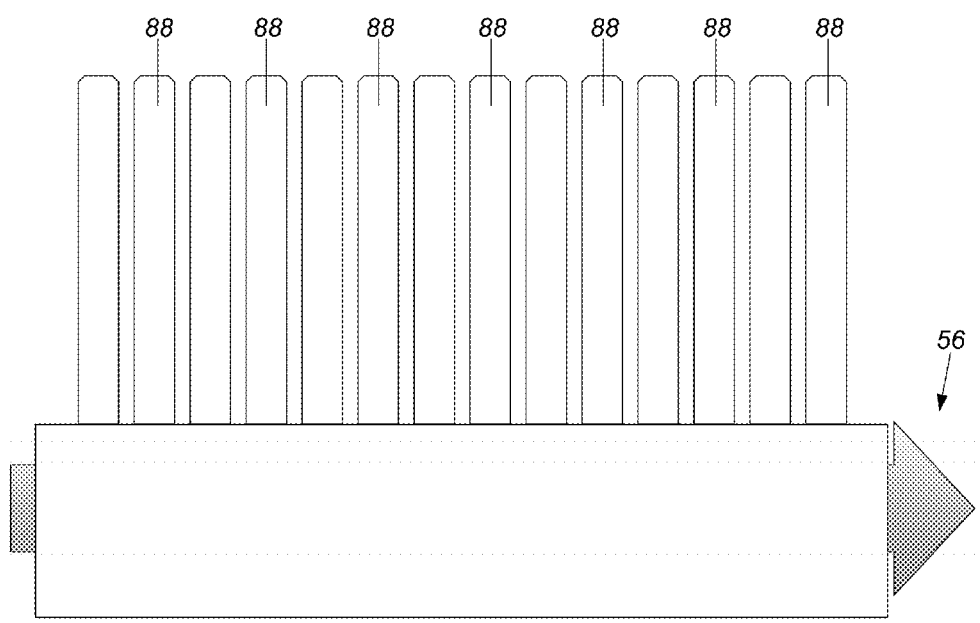
FIG. 15 is a detailed solar collector using solar evacuated tube schematic of the solution for reducing the cost to heat and air condition a home. This illustration shows thermal storage residing in the manifold and/or the evacuated tubes. This unit can be sized to work with existing heating/air conditioning systems.

FIG. 15 is one embodiment of the solar collector 56. In this embodiment evacuated tubes 88 are utilized to collect the solar energy from the sun and transfer it to the refrigerant utilizing the integral manifold 78.

Figure 16:
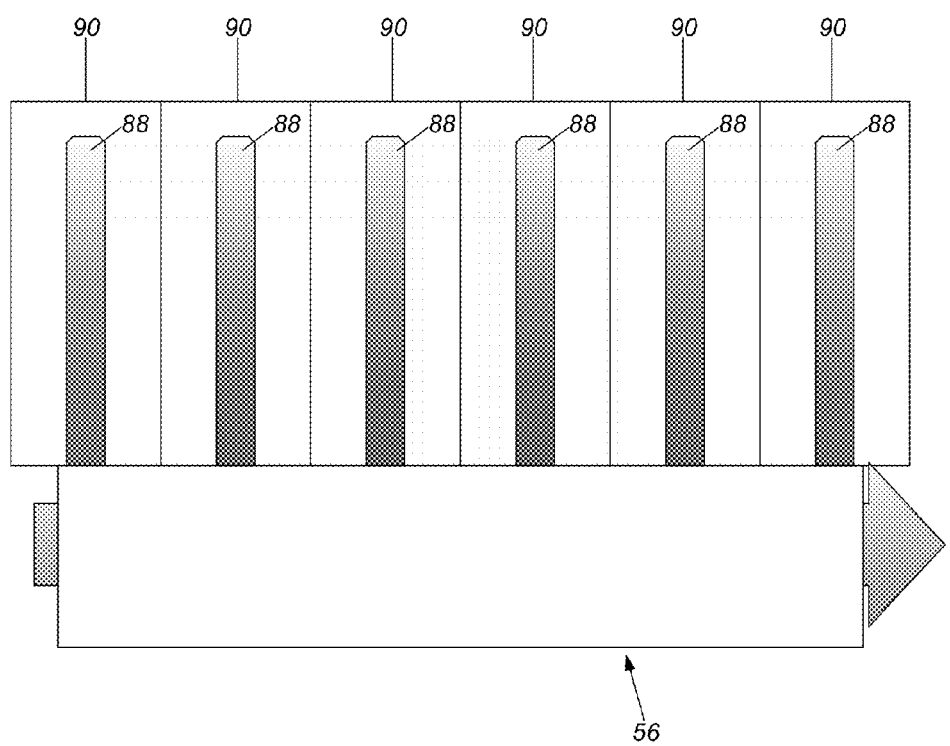
FIG. 16 is a detailed solar collector using solar evacuated tubes and compound parabolic concentrator (CPC) schematic of the solution for reducing the cost to heat and air condition any space. This illustration show thermal storage residing in the manifold and/or the evacuated tubes. This unit can be sized to work with existing heating/air conditioning systems.
Figure 17:
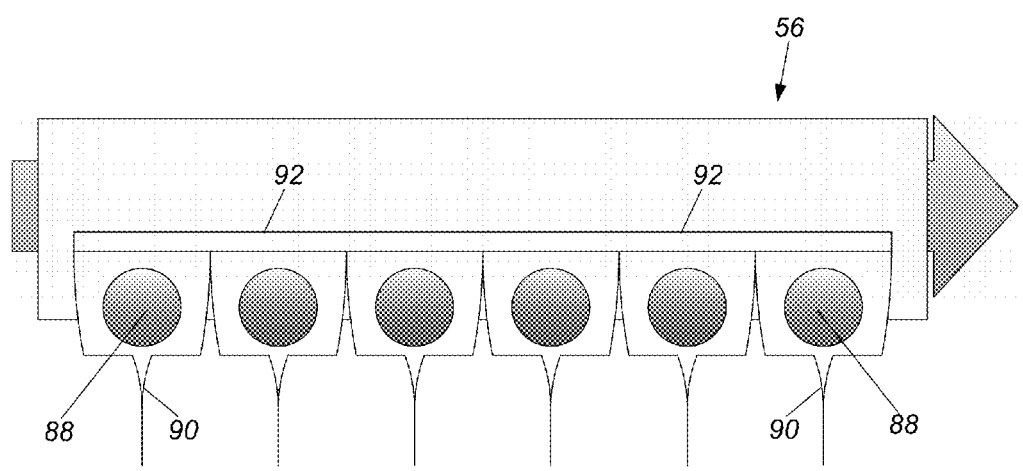
FIG. 17 is a top view of a detailed solar collector using solar evacuated tubes and compound parabolic concentrator (CPC) and Fresnel lens schematic of the solution for reducing the cost to heat and air condition any space. This illustration shows thermal storage residing in the evacuated tubes.

FIG. 16 is another embodiment of the solar collector 56. In this embodiment both evacuated tubes 88 and compound parabolic concentrators (CPC) 90 are utilized to collect the solar energy from the sun and transfer it to the refrigerant utilizing the integral manifold 78.

FIG. 17 is another embodiment of the solar collector 56. In this embodiment the solar collector is equipped with evacuated tubes 88, compound parabolic concentrators (CPC) 90, and Fresnel lens 92 to collect solar energy and transfer it to the refrigerant utilizing the integral manifold 78. FIG. 17 is a top view of the solar collector 56 equipped with evacuated tubes 88, compound parabolic concentrator (CPC) 90, and Fresnel lens 92.

Figure 18:
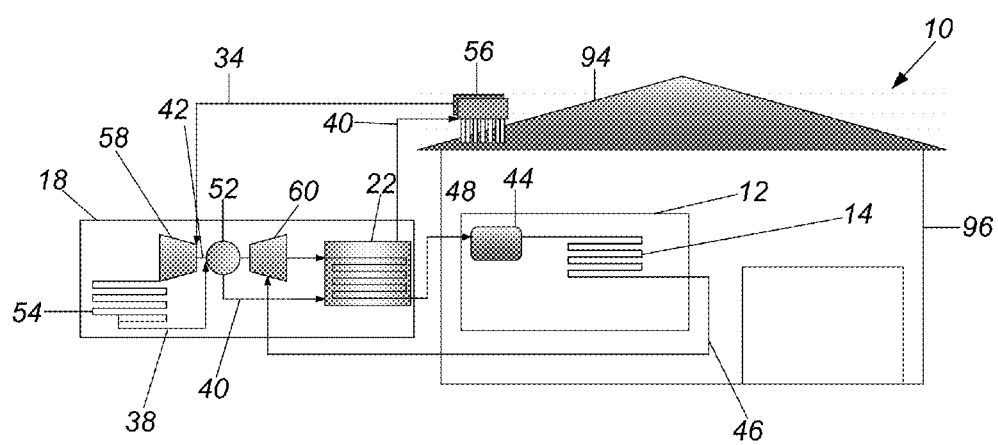
FIG. 18 is a system schematic of the present invention installed in a home utilizing the same footprint as the conventional outside A/C unit.

FIG. 18 illustrates one embodiment of the present invention installed in a home or business 10. An air handler 12 is installed inside of the home or business 10. The air handler 12 includes an evaporator 14 and a metering device 44. The evaporator 14 cools the air within the home or business by expansion of a refrigerant within the evaporator 14 and changing of the refrigerant from a liquid to a gas. This change of state of the refrigerant results in a release of energy. The most popular refrigerants utilized in convention air-conditioning systems are Freon® R12, R22, R134A, R410A, and more recently Freon® R245fa. Subsequent to the air within the building being cooled by passing over the evaporator 14, the refrigerant is sent to the outside unit 18. The outside unit 18 includes a compressor 60 and a condenser 22. The gaseous refrigerant from the evaporator 14 is passed through the compressor 60. In the compressor 60 the gas is highly compressed. At this point energy is added to the system from the compressor 60 which in normally electrically powered. Next the compressed gas is passed into the condenser 22 where it changes from a gas to a liquid by releasing heat into the atmosphere. From the condenser 22 the liquid refrigerant is passed through a metering device 44 into the evaporator 14 and the cooling cycle is repeated.

In this embodiment of the present invention, a solar collector 56 is located on the roof 94 of the building 96 of the home or business 10. The system of the present invention is added onto an existing outside unit of a conventional HVAC system. The system of the present invention includes a solar concentrator/collector 56, a turbine/expander 58, a condenser 54, and a liquid pump 52 and motor/generator 72. There are also fluid connections 34, 38, and 40 between the solar concentrator/collector 56, the turbine/expander 58, the condenser 54, and the liquid pump 52 respectively. The fluid entering the solar collector 56 is a liquid. It changes into a gas in the solar concentrator/collector 56 and drives the turbine/expander 58. When the gas is expanded within turbine/expander 58, work is extracted. A shaft 42 is connected to the turbine/expander 58, the liquid pump 52 and a compressor 60 and motor/generator 72. The work from the turbine/expander 58 drives both the liquid pump 52 and the compressor 60 and motor/generator 72. The fluid in the Solar turbine drive closed loop system 24 is a refrigerant, such as Freon® R134A or R245fa (or others authorized by ASHRAE Refrigeration standards founded in 1894). Compressor 60 is a part of a conventional HVAC system. A gaseous refrigerant, such as Freon®, is fed into the compressor 60 through fluid line 46 from a conventional HVAC system. Compressed refrigerant leaves the compressor 60 and is fed into the conventional HVAC system through fluid line 48. Since the shaft 42 drives the compressor 60 a motor is not required to operate the compressor 60. Because an electric motor normally operates the compressor 60, a substantial cost savings is achieved by elimination of the electric motor. Additionally, the equipment within the box 18 can be readily added-on to an existing HVAC system.

Figure 19:
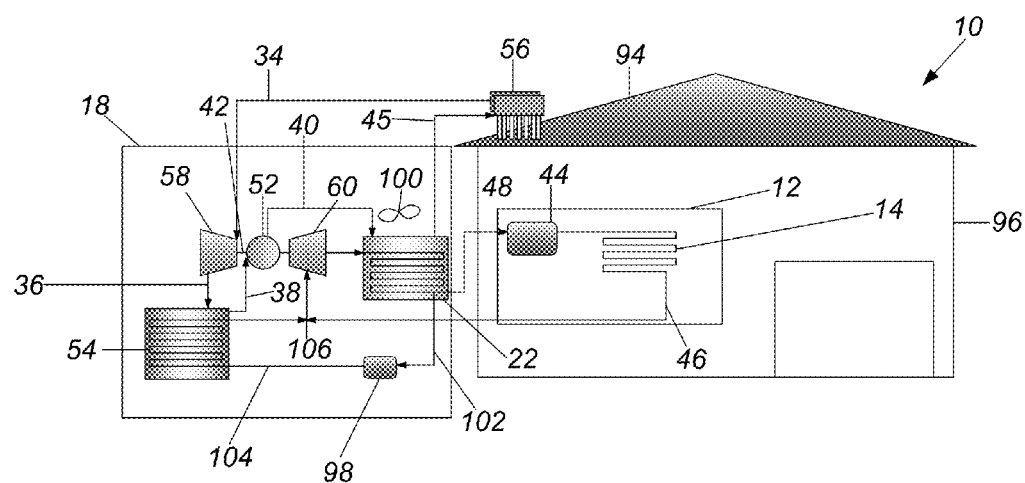
FIG. 19 is an alternative embodiment of the system schematic similar illustrated in FIG. 18. It includes a metering device to reroute flow to eliminate the need for running the outside condenser fan and bypassing cooling flow.

FIG. 19 is another embodiment of the present invention. This embodiment is similar to the embodiment illustrated in FIG. 18 and described herein above. In this other embodiment a second metering device 98 is added to the system. This addition to the outside unit 18 enables the outside unit 18 to operate without the need to run the outside condenser fan 100. An air handler 12 is installed inside of the home or business 10. The air handler 12 includes an evaporator 14 and a metering device 44. The evaporator 14 cools the air within the home or business by expansion of a refrigerant within the evaporator 14 and changing of the refrigerant from a liquid to a gas. This change of state of the refrigerant results in a release of energy. The most popular refrigerants utilized in convention air-conditioning systems are Freon® R12 or R245fa and more recently Freon® R134A. Subsequent to the air within the building being cooled by passing over the evaporator 14, the refrigerant is sent to the outside unit 18. The outside unit 18 includes a compressor 60 and a condenser 22. The gaseous refrigerant from the evaporator 14 is passed through the compressor 60. In the compressor 60 the gas is highly compressed. At this point energy is added to the system from the compressor 60 which in normally electrically powered. Next the compressed gas is passed into the condenser 22 where it changes from a gas to a liquid by releasing heat into the atmosphere. From the condenser 22 the liquid refrigerant is passed through a metering device 44 into the evaporator 14 and the cooling cycle is repeated.

In this other embodiment of the present invention, a solar concentrator/collector 56 is located on the roof 94 of the building 96 of the home or business 10. The system of the present invention is added onto an existing outside unit of a conventional HVAC system. The system of the present invention includes a solar concentrator/collector 56, a turbine/expander 58, a condenser 54, and a liquid pump 52. There are also fluid connections 34, 38, and 40 between the solar concentrator/collector 56, the turbine/expander 58, the condenser 54, and the liquid pump 52 respectively. The fluid entering the solar concentrator/collector 56 is a liquid. It changes into a gas in the solar concentrator/collector 56 and drives the drives the turbine/expander 58. When the gas is expanded within turbine/expander 58, work is extracted. A shaft 42 is connected to the turbine/expander 58, the liquid pump 52 and a compressor 60. The work from the turbine/expander 58 drives both the liquid pump 52 and the compressor 60. The fluid in the closed loop system is a refrigerant, such as Freon® R134A or R245fa. Compressor 60 is a part of a conventional HVAC system. A gaseous refrigerant, such as Freon®, is fed into the compressor 60 through fluid line 46 from a conventional HVAC system. Compressed refrigerant leaves the compressor 60 and is fed into the conventional HVAC system through fluid line 48. Since the shaft 42 drives the compressor 60 a motor is not required to operate the compressor 60. In this embodiment a portion of the refrigerant from the condenser 22 is diverted through line 102 to a second metering device 98. From the second metering device 98 the diverted refrigerant becomes a gas and wants to absorb heat. It is then sent through line 104 to condenser 54. From condenser 54 the refrigerant is sent back into fluid line 46 at junction 106. This portion of the refrigerant that bypasses of the air handler 12 within the home or business 10 does not add a substantial amount of energy to the refrigerant since it is not exposed to the warm air within the home or building 10. Next this bypass portion of the refrigerant is sent to condenser 54 where it is cooled. The cooled refrigerant is blended with the refrigerant from the air handler 12. This cooled refrigerant allows the refrigerant to be condensed into a liquid in condenser 22 without the need to remove energy by utilizing the cooling fan 100 on the condenser 22. As described herein above, the equipment within the box 24 can be readily added-on to an existing HVAC system.

FIG. 20 is a chart which illustrates the various different starting modes for the turbine of the present invention. In start modes 1-3 and Run-bad weather, the started motor is employed. A clutch on each of the motor, the compressor, the pump, and the turbine permit these devices to be independently connected to and operated by the solar concentrator/collector of the present invention.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A renewable energy heating and air-conditioning system comprising:
   a heating and air-conditioning circuit, said heating and air-conditioning circuit comprising an evaporator, a first condenser, a compressor, and a metering device; said evaporator being in fluid communication with said compressor, said compressor being in fluid communication with said first condenser, said first condenser being in fluid communication with said metering device, said metering device being in fluid communication with said evaporator;
   a first fluid refrigerant contained within and circulating through said heating and air-conditioning circuit;
   a renewable energy driven circuit, said renewable energy driven circuit comprising at least one renewable energy collector, at least one thermal storage device, at least one turbine, a second condenser, a fluid pump and a motor/generator;
   a second fluid refrigerant contained within and circulating through said renewable energy driven circuit;
   said at least one renewable energy collector being in fluid communication with said at least one turbine, said at least one turbine being in fluid communication with said second condenser, said second condenser being in fluid communication with said at least one fluid pump, said at least one fluid pump being in fluid communication with said at least one renewable energy collector;
   a manifold that is integral with said at least one renewable energy collector, said manifold being constructed and arranged to store thermal energy which is used to vaporize said second refrigerant in said renewable energy driven circuit;
   a drive shaft mechanically connected to said motor/generator, said at least one turbine, said compressor and said at least one fluid pump, wherein said at least one turbine drives aid compressor, said at least one fluid pump and said motor/generator through said drive shaft;
   said renewable energy collector being in fluid communication with said compressor and increasing temperature of said second fluid refrigerant to create a larger temperature differential with said first fluid refrigerant and condensing said first fluid refrigerant without a cooling fan and energy needed for the cooling fan;
   said renewable energy circuit being constructed and arranged as a module which can be readily connected to said evaporator of said heating and air conditioning circuit, wherein use of said renewable energy circuit decreases electrical power consumption of said heating and air conditioning circuit.

2. The renewable energy heating and air-conditioning system of claim 1 wherein said at least one renewable energy collector is a solar energy collector.

3. The renewable energy heating and air-conditioning system of claim 2 wherein said at least one renewable energy collector includes a plurality of evacuated tubes, said evacuated tubes being constructed and arranged to capture solar energy and transfer the solar energy to said second refrigerant.

4. The renewable energy heating and air-conditioning system of claim 3 wherein said at least one renewable energy collector includes a solar compound parabolic concentrator/reflector juxtaposed to each said Solar evacuated tube.

5. The renewable energy heating and air-conditioning system of claim 4 including a Solar Fresnel lens located adjacent all of said solar evacuated tubes.

6. The renewable energy heating and air-conditioning system of claim 2 comprising a first thermal storage module connected to said at least one renewable energy collector, said first thermal storage module being used to store thermal energy which is used to vaporize said second refrigerant in said renewable energy driven circuit.

7. The renewable energy heating and air-conditioning system of claim 2 comprising a first thermal storage module connected to said at least one renewable energy collector, said first thermal storage module being used to store thermal energy which is used to vaporize said second refrigerant and provide solar heated water.

8. The renewable energy heating and air-conditioning system of claim 1 including a fluid bypass line, said fluid bypass line connected to an inlet of said at least one turbine and an outlet of said at least one turbine, gaseous said second refrigerant in said renewable energy driven circuit bypasses said at least one turbine through said fluid bypass line during start mode.

9. The renewable energy heating and air-conditioning system of claim 1 comprising at least one heat exchanger coupled to said compressor being in fluid communication with said at least one renewable energy collector being in fluid communication with said at least one heat exchanger, said first heat exchanger being in fluid communication with said refrigerant in said heating and air-conditioning circuit, said first heat exchanger being in fluid communication with said second refrigerant in said renewable energy driven circuit, wherein heat removed from said first refrigerant is transferred to said second refrigerant for preheating said second refrigerant prior to said second refrigerant entering said at least one renewable energy collector, said heat being removed from said first refrigerant allows for fluid to become liquid without operating a condenser.

10. The renewable energy heating and air-conditioning system of claim 1 wherein said motor/generator includes a variable speed starter motor/electrical generator to operate said fluid pump during a start-up operational mode of said renewable energy driven circuit.

11. The renewable energy heating and air-conditioning system of claim 10 wherein said variable speed starter motor/electrical generator is used to produce electricity during renewable energy heating and air-conditioning operation.

12. The renewable energy heating and air-conditioning system of claim 1 wherein said first and second fluid refrigerants are reduced to a single common fluid refrigerant.

13. The renewable energy heating and air-conditioning system of claim 1 wherein said first fluid refrigerant is a cooling fluid refrigerant and said second fluid refrigerant is a drive system refrigerant.

14. The renewable energy heating and air-conditioning system of claim 1 wherein said first and second fluid refrigerants have USA ASHRAE thermophysical fluid refrigerant properties.

15. The renewable energy heating and air-conditioning system of claim 1 comprising a fluid bypass line, said fluid bypass line being connected to an inlet of said at least one fluid pump and an outlet of said at least one fluid pump, said second refrigerant in said renewable energy driven circuit bypasses said at least one fluid pump through said fluid bypass line; and said motor/electrical generator is connected to and operates said fluid pump during a non solar driven operation mode of said renewable energy driven circuit.

* * * * *